US008373889B2

(12) United States Patent
Arai

(10) Patent No.: US 8,373,889 B2
(45) Date of Patent: Feb. 12, 2013

(54) METHOD, SYSTEM, AND PROGRAM OF EXTENDING A FUNCTION OF AN APPLICATION

(75) Inventor: Katsutoshi Arai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 12/725,234

(22) Filed: Mar. 16, 2010

(65) Prior Publication Data

US 2010/0245922 A1    Sep. 30, 2010

(30) Foreign Application Priority Data

Mar. 26, 2009    (JP) ................. 2009-076771

(51) Int. Cl.
*H04N 1/40* (2006.01)
*H04N 1/393* (2006.01)
*G06K 15/00* (2006.01)
(52) U.S. Cl. ............... 358/1.18; 358/449; 358/451
(58) Field of Classification Search ............ 358/443, 358/1.18, 449, 451, 1.15
See application file for complete search history.

(56) References Cited

U.S. PATENT DOCUMENTS

| 6,459,430 B1* | 10/2002 | Kusumo-Rahardjo et al. | 345/428 |
| 7,881,334 B2* | 2/2011 | Yasuda | 370/465 |
| 2002/0016960 A1* | 2/2002 | Yamato et al. | 725/1 |
| 2010/0171977 A1* | 7/2010 | Fu | 358/1.15 |
| 2010/0274469 A1* | 10/2010 | Takahata et al. | 701/200 |

FOREIGN PATENT DOCUMENTS

JP    2003-216366 A    7/2003

* cited by examiner

*Primary Examiner* — Jerome Grant, II
(74) *Attorney, Agent, or Firm* — Canon USA Inc IP Division

(57) ABSTRACT

In plug-in software capable of creating a sheet size to be set in an application based on an output size and sheet sizes allowed to be set in the application, when the plug-in software supports a plurality of applications, if there is a difference in sheet size among the applications, it is necessary to change setting in terms of the size when data is shared by the applications. This necessity of changing the setting in terms of the size is avoided by detecting a smallest sheet size from maximum sheet sizes usable in the respective applications and determining the sheet size for common use by the applications based on the detected smallest size.

9 Claims, 11 Drawing Sheets

METHOD, SYSTEM, AND PROGRAM OF EXTENDING A FUNCTION OF AN APPLICATION

BACKGROUND OF THE INVENTION

1. Field of the Invention

The present invention relates to a method, a system, and a program of extending a function of an application.

2. Description of the Related Art

When data being edited or displayed using an application is printed using a printer, the printing is generally performed via a printer driver adapted to the printer. In the printing, in order to achieve a correct size desired by a user for a printed matter output by the printer, the user needs to properly set the application and the printer driver. In many general-purpose applications, a sheet size is allowed to be set within a range lower than a prescribed maximum size. Therefore, when a user wants to obtain a printed matter with an output size greater than the maximum size, the user needs to perform the following procedure: (1) A calculation is performed to determine the sheet size to be set in the application such that the sheet size has the same aspect ratio as that of the output size and the sheet size falls within the range allowed to be set in the application. Note that the term "output size" is used to describe the size employed in the outputting; (2) The calculated sheet size is set in the application; and (3) A printer driver is set in terms of a scaling factor such that the sheet size is correctly scaled to the output size.

In many applications, a technique/method to extend functions thereof is openly available. Specific examples of such applications include Microsoft Office, Microsoft Internet Explorer (registered trademark of Microsoft Corporation), etc. In these applications, users are allowed to extend a function by registering a function addition program called a plug-in program according to a method open to the public. A description on a specific method of extending a function of an application using a plug-in program may be found, for example, in Japanese Patent Laid-Open No. 2003-216366.

To obtain a printed matter with a size greater than a maximum sheet size allowed to be specified in an application, a user needs to perform the above-described procedure that is time-consuming and troublesome. This problem may be solved by performing the above-described procedure by using a function extension capability provided by a plug-in program.

In general, plug-in programs are installed separately for respective applications. However, in Microsoft Office provided by Microsoft Corporation, a common-use plug-in program is allowed to be installed in a plurality of applications having different functions to extend the functions so that data produced by an application can be shared by other applications. These applications with different functions provided by Microsoft Office available from Microsoft Corporation are highly compatible with each other, and thus the common use of the plug-in program for all these applications can provide high usability.

However, in a case where a plug-in program is used in common by Microsoft Word and Microsoft PowerPoint, the maximum usable sheet size is different between these two applications. That is, the maximum sheet size usable for Microsoft Word is about 55 cm×55 cm, but about 130 cm×130 cm for Microsoft PowerPoint. Therefore, when data is produced by the plug-in program such that the data is edited/displayed with a maximum sheet size allowed for one of the applications, the following problem can occur.

When data produced by a first application is copied and pasted into a second application to use it therein, if there is a difference in sheet size set in these two applications, the size set in the first application cannot be directly employed in the second application. That is, in this case, it is necessary to open the first application and reset the sheet size to be the same as that set in the second application. Furthermore, it is necessary to modify sizes and/or locations of drawings or the like as required. On the other hand, when data with different sheet sizes produced by different applications are output on sheets with the same output size, it is necessary to calculate the scaling factor by which to scale the original sheet size to the final output size for each application, and it is further necessary to set the calculated scaling factor in the printer driver. The above-described problem becomes obvious in particular when printing is performed on a sheet with a size greater than the maximum sheet size settable in an application by using a large format printer or the like and by scaling the size using the printer driver as in a case where printing is performed on an elongated sheet, a banner, or the like. The problem described above causes users to have a great difficulty when printing is performed on a sheet with a great size using a general-purpose application.

SUMMARY OF THE INVENTION

In view of the above, the present invention provides a technique to achieve extension of functions of applications by using a plug-in program that operates in common on the applications having different functions, thereby to provide improved operability to users.

According to an aspect of the present invention, there is provided a method, used in common by a plurality of applications installed on a computer connected to a printing apparatus, for extending a function of the plurality of applications, comprising specifying an output size indicating a size of a printed matter to be output by the printing apparatus, acquiring an edit sheet size by selecting a predetermined size from sheet sizes that are allowed to be set in common in the plurality of applications, and determining a sheet size to be set for the plurality of applications based on the output size specified in the specifying and based on the edit sheet size acquired in the acquiring.

According to the aspect of the present invention, the smallest one of the maximum sheet sizes usable by the plurality of applications for which the function of the plug-in program is supported is employed as the edit sheet size for the applications. Use of the same sheet size for all applications makes is possible to share data among the different applications, which provides improved usability to users.

Further features of the present invention will become apparent from the following description of exemplary embodiments with reference to the attached drawings.

DESCRIPTION OF THE EMBODIMENTS

The present invention is described in further detail below with reference to embodiments of printing systems.

Figure 1:
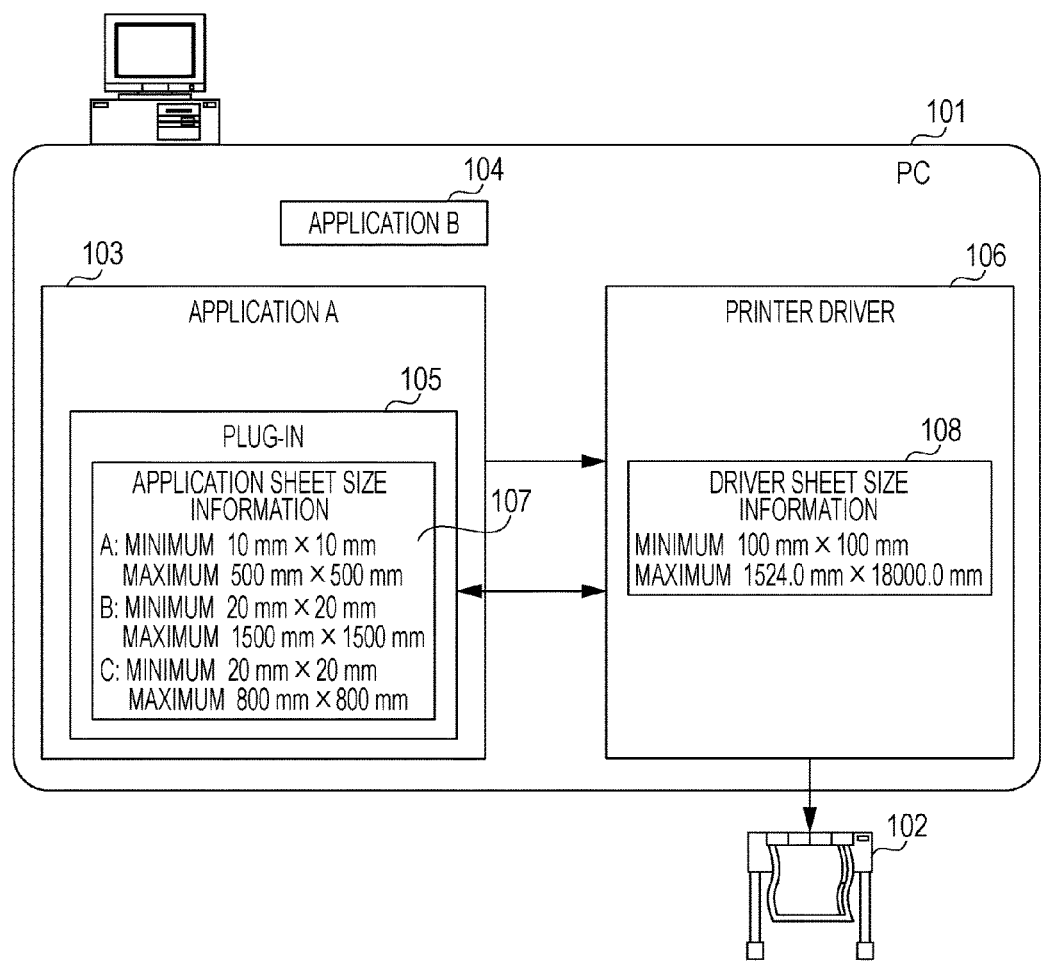
FIG. 1 is a block diagram illustrating an internal configuration of a system having plug-in software.

FIG. 1 illustrates a configuration of a system having a plug-in software according to an embodiment of the present invention. The system includes a personal computer (PC) 101 and a printer 102 typified by a large format printer. Applications 103 and 104 are operable on the PC 101. As described above, a technique to install an additional function in these applications 103 and 104 is openly available. Hereinafter, a function extension unit configured to extend a function of an application will be simply referred to as a plug-in. A plug-in 105 operates on applications such that setting of applications is performed via the plug-in 105 as described in further detail later, and the plug-in 105 also operates in cooperation with a printer driver that controls a printer. The plug-in 105 is adapted to the application A 103 and the application B 104 shown in FIG. 1 and also to an application C not shown in the figure. The plug-in 105 can be used in common by these applications. Main parts of the present embodiment of the invention lie in the plug-in 105.

A printer driver 106 performs a printing operation in response to a request received from an application via an operating system (OS). If the printer driver 106 receives a print command via the OS, the printer driver 106 interprets the received print command and performs a process to produce print data interpretable by a printer. The printer driver 106 can receive a request from the plug-in 105 to change the setting in terms of printing. Application sheet size information 107 is information about sheet sizes settable in applications for which the function of the plug-in 105 is supported. In the example shown in FIG. 1, the application sheet size information 107 indicates that minimum and maximum sheet sizes settable in the application A are 10 mm×10 mm to 500 mm×500 mm, and 20 mm×20 mm and 1500 mm×1500 mm for the application B, and 20 mm×20 mm and 800 mm×800 mm for the application C.

The application sheet size information 107 is held by the plug-in 105 and used in processes that will be described later. Driver sheet size information 108 is information indicating sheet sizes that can be set in the printer driver 106. In the example shown in FIG. 1, the driver sheet size information 108 indicates that minimum and maximum sheet sizes that can be set in the printer driver are 100 mm×100 mm and 1524.0 mm×18000.0 mm. The driver sheet size information 108 is held by the printer driver 106, and the plug-in 105 can acquire the driver sheet size information 108 by sending a query to the printer driver 106 about it.

Figure 2:
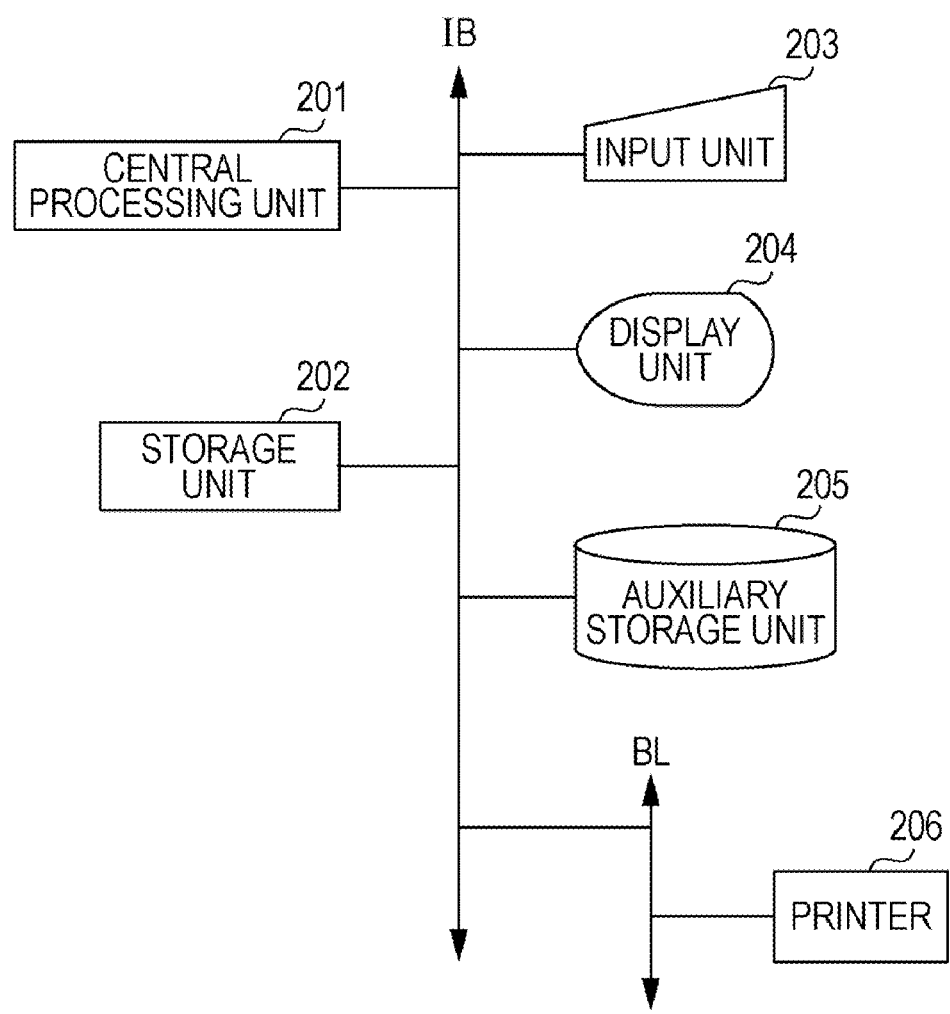
FIG. 2 is a diagram illustrating a configuration of a personal computer having plug-in software and also illustrating an external connection.

FIG. 2 is a block diagram illustrating an internal structure of the PC 101 and also illustrating an external connection.

This PC 101 is configured in a widely used manner as described below. That is, the PC 101 includes a central processing unit (CPU) 201, a storage unit 202 such as a RAM, an input unit 203 such as a mouse and keyboard, a display unit 204 such as a CRT or LCD, and an auxiliary storage unit 205 such as a hard disk. These parts in the PC 101 are connected to each other via an internal bus line IB. The input unit 203 is used by a user to input various commands and/or data associated with objects such as an icon, a menu, or the like displayed by applications on the display unit 204.

In the auxiliary storage unit 205, programs such as the plug-in 105, the application A 103, the application B 104, the OS, etc., and other program information are stored. These programs are called as required by the central processing unit 201 and stored in the storage unit 202. The internal bus line IB of the PC 101 is connected to the printer 102 via an external bus line BL. This allows the PC 101 to register a job in the printer 102.

Next, an operation of the plug-in 105 installed in an application is explained. In the following explanation, Microsoft Word (trademark) is taken as an example of a general-purpose application. Microsoft Word is an application that is used to produce a general document or a document to be printed, and, as described above, a technique to extend functions thereof by using a plug-in is openly available. Hereinafter, the term "application" is used to describe Microsoft Word unless otherwise stated.

Figure 3:
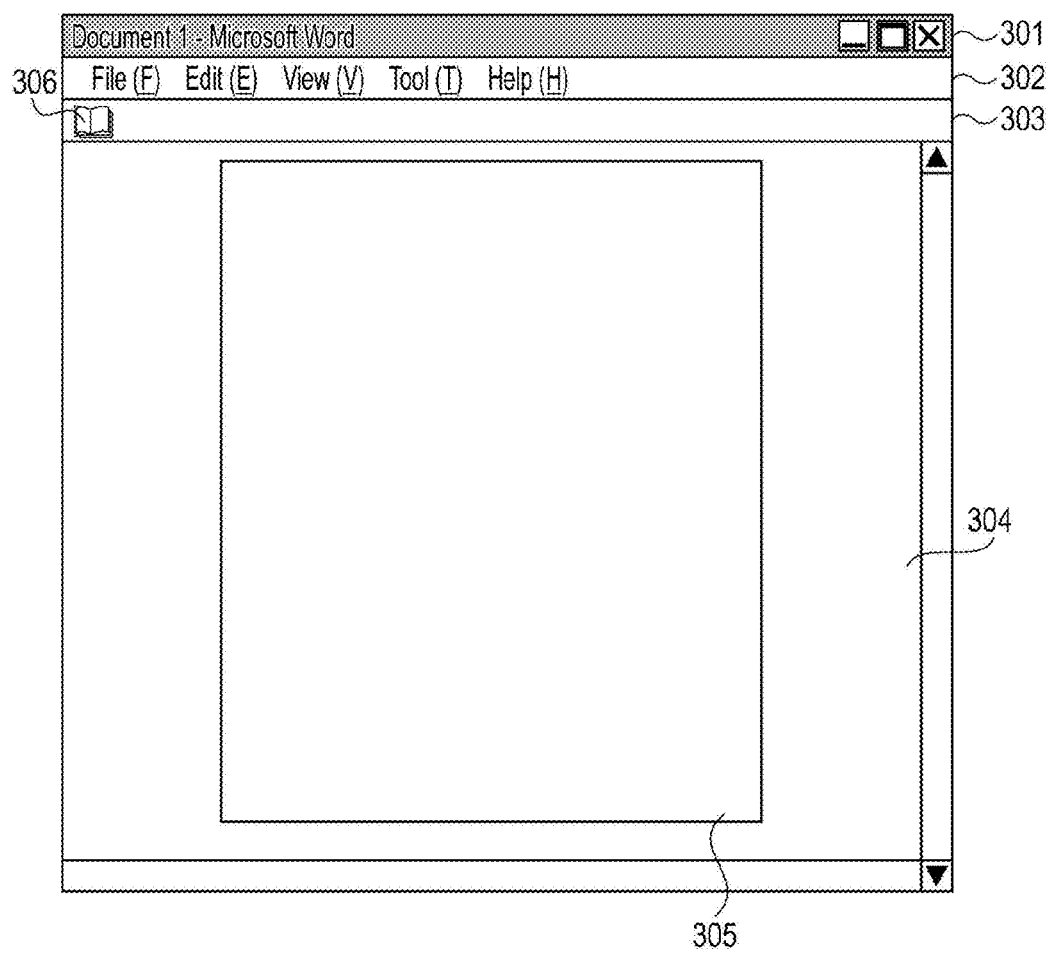
FIG. 3 is a diagram illustrating a screen that is initially displayed when an application is started.

FIG. 3 illustrates a screen that is initially displayed when the application is started. This application screen includes a title bar 301 indicating a document title, a menu bar 302 in which functions provided by the application are displayed in the form of a menu, a tool bar 303 in which functions provided by the application are displayed in the form of icons or the like, and a document display area 304.

In the document display area 304, a document 305 being currently edited by a user is displayed. In this example, it is assumed that the sheet size of the document 305 is set to A4 (210 mm×297 mm) that is a sheet size widely used in the application.

A plug-in activation icon 306 is displayed on the tool bar 303 of the application when the plug-in 105 is installed in the application. In the present example, it is assumed that the plug-in 105 has already been installed in the application. The plug-in may be installed in the application in a known method although a further explanation thereof is not given herein.

Figure 4:
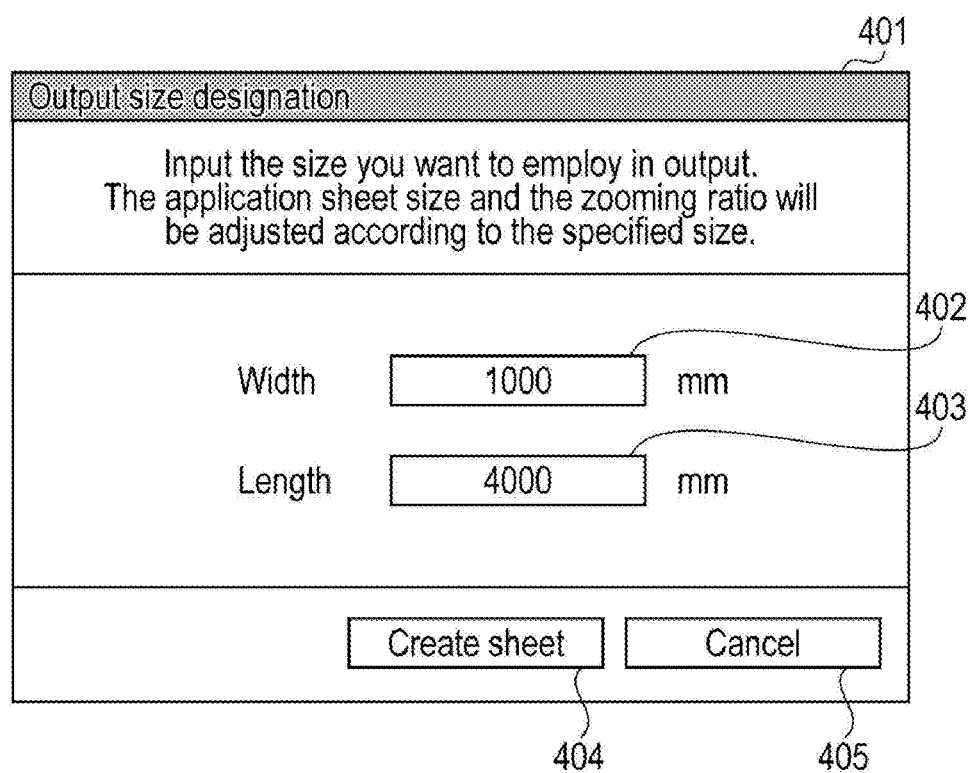
FIG. 4 is a diagram illustrating an example of a dialog box that allows a user to specify an output size.

FIG. 4 illustrates an output sheet size designation dialog box 401 that is displayed when the plug-in activation icon 306 is pressed by a user.

The output sheet size designation dialog box 401 includes controls used by a user to designate the size of a printed matter to be output by the printer 102. If the plug-in activation icon 306 is pressed, the application screen used by a user to input a command/data is switched to the output sheet size designation dialog box 401 and changing of settings associated with the application is disabled.

A width designation control 402 allows a user to designate the width of the output size in units of millimeters. A length designation control 403 allows a user to designate the length of the output size in units of millimeters. The range of the output size that can be designated by the plug-in depends on sheet sizes printable by the printer. Therefore, the maximum allowable output size is equal to the maximum sheet size printable by the printer. For example, when a large format printer is used as the printer, it is possible to designate a size greater than the maximum sheet size allowed to be set in the application. If the sheet creation button 404 is pressed by a user, the setting of the application and the setting of the printer driver are changed according to the specified output size.

The output sheet size designation dialog box 401 is then closed and the user-input screen is switched to the application screen from the output sheet size designation dialog box 401. A cancel button 405 is allowed to be pressed by a user at any time when the output sheet size designation dialog box 401 is displayed. If the cancel button 405 is pressed, the setting made by a user on the output sheet size designation dialog box 401 is cancelled, and the output sheet size designation dialog box 401 is closed and the user-input screen is switched to the application screen.

Figure 5:
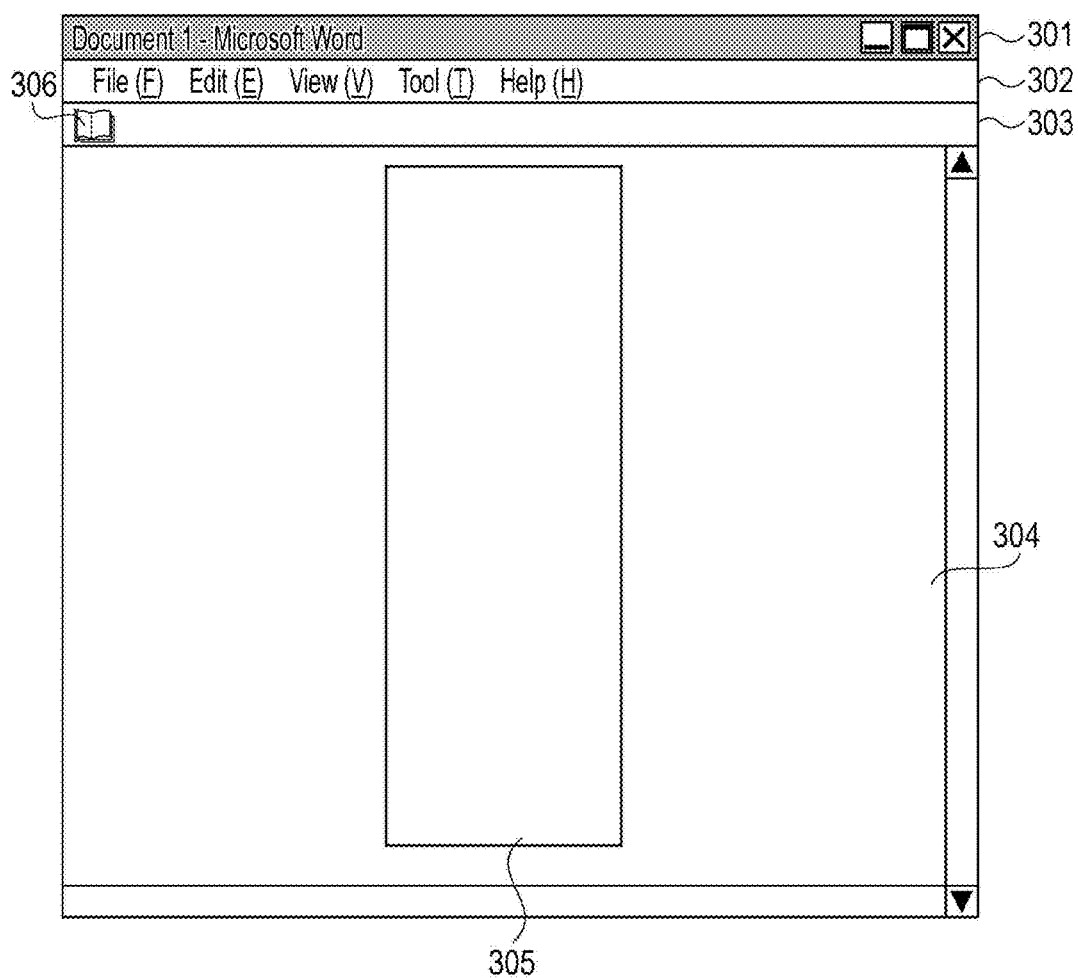
FIG. 5 is a diagram illustrating a screen that is displayed after setting of a sheet size for an application is changed.

FIG. 5 illustrates the application screen in a state in which the user-input screen has returned to the application screen in response to pressing of the sheet creation button 404 in the output sheet size designation dialog box 401. In this example, the document 305 displayed in the document display area 304 is set to have the size equal to the output sheet size of 1000 mm in width and 4000 mm in length designated in FIG. 4.

Internally, a process described later is performed to set the printer driver in terms of the scaling so that the final printed matter has the designated size.

In this state, a user is allowed to input characters and put an object such as an illustration on the document 305. If printing is then performed using the printer 102 via the printer driver 106, a printed matter with the specified output size is obtained.

Next, the operation of the plug-in according to the present embodiment of the invention is explained in further detail below with reference to a flow chart.

Figure 6:
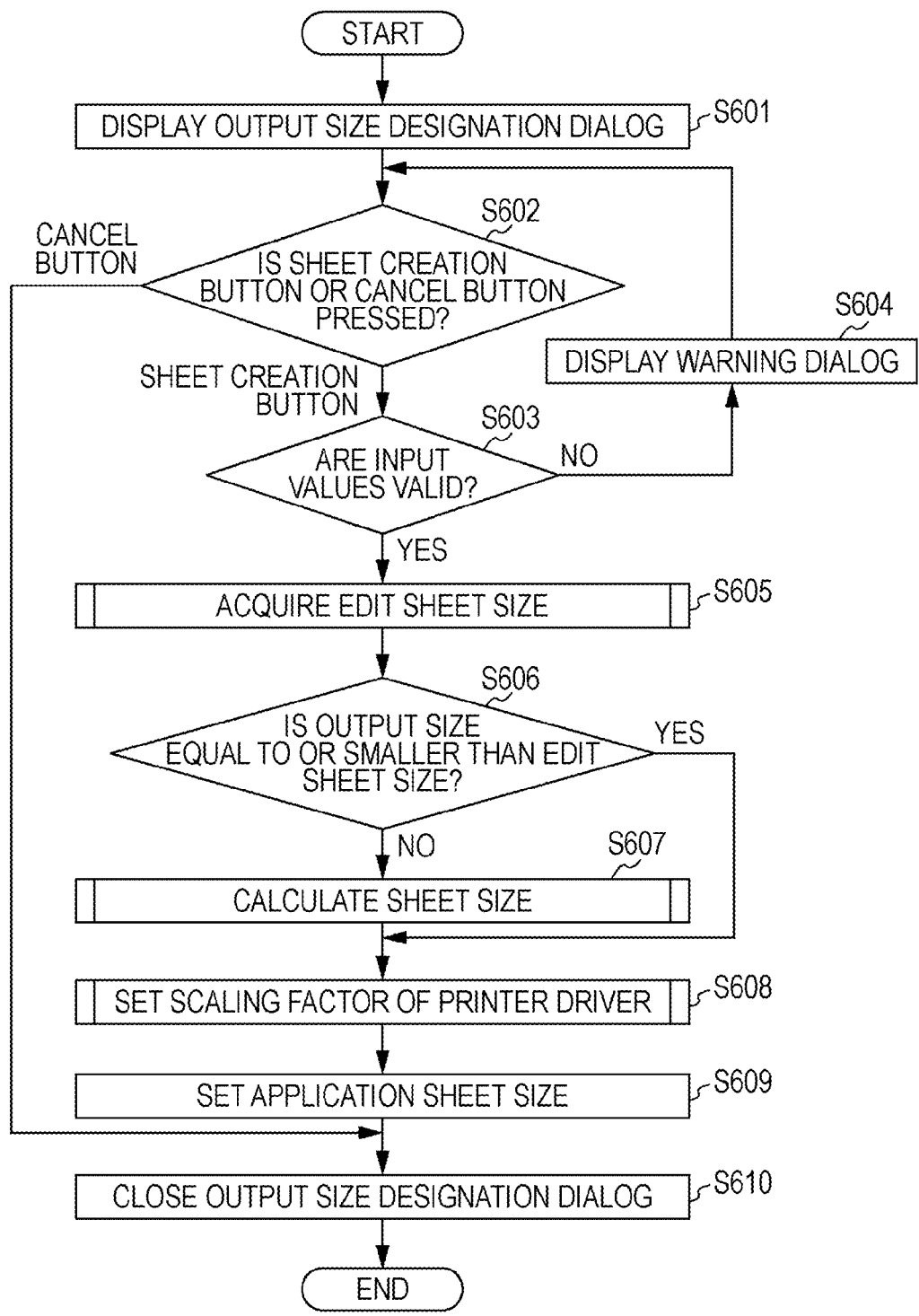
FIG. 6 is a flow chart illustrating a process associated with a plug-in program.

FIG. 6 is a flow chart illustrating a process including a sequence of operation steps performed by the plug-in according to the present embodiment of the invention. If a user presses the plug-in activation icon 306 on the tool bar 303 of the application, the operation starts, and control transfers to step S601.

In step S601, the output sheet size designation dialog box 401 described above is displayed, and the process waits for inputting to be performed by a user. If the user presses the sheet creation button 404 or the cancel button 405 on the output sheet size designation dialog box 401, then in step S602 a determination is performed as to which button is pressed. If it is determined that the cancel button 405 is pressed, then the process proceeds to step S610. In step S610, the output sheet size designation dialog box 401 is closed and the process is ended.

On the other hand, in a case where it is determined that the button pressed by the user is the sheet creation button 404, the process proceeds to step S603. In step S603, a judgment is made as to whether the values in terms of the output size input via the width designation control 402 and the length designation control 403 are valid. If an input value is not a numeric or if a negative value is input, the value is regarded as invalid. In a case where no value is input, the judgment result becomes negative. In a case where the input size is out of the range supported by the printer 102, the size is also regarded as invalid. In the judgment as to whether the size is within the range supported by the printer 102, the plug-in 105 acquires information indicating the range supported by the printer 102 by sending a query to the printer driver 106 about it, and the judgment is made based on the acquired information.

Figure 7:
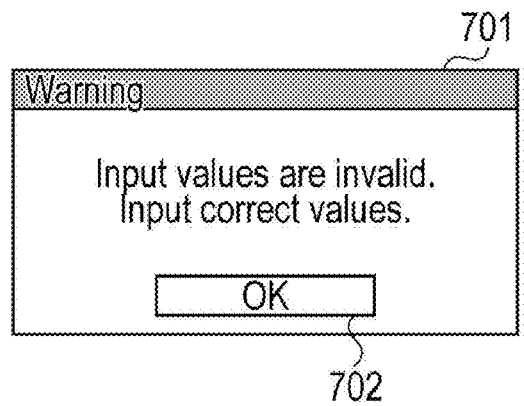
FIG. 7 is a diagram illustrating a dialog box that is displayed when an invalid output size is specified.

If it is determined in step S603 that the specified output size is invalid, then the process proceeds to step S604. In step S604, a warning dialog box 701 shown in FIG. 7 is displayed. If the user presses an OK button 702 in the warning dialog box 701, the output sheet size designation dialog box 401 is again displayed, and the process waits until inputting is performed by the user.

In a case where it is determined in step 603 that the specified output size is valid, the process proceeds to step S605. In step S605, an edit sheet size is acquired.

Figure 8:
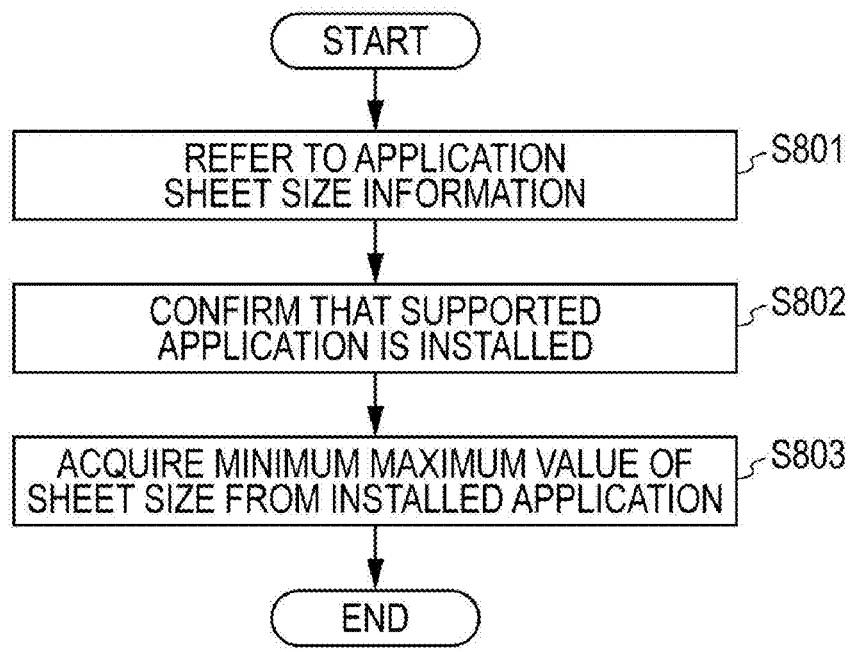
FIG. 8 is a flow chart illustrating a program of acquiring an edit sheet size.

FIG. 8 is a flow chart illustrating an edit sheet size acquisition program performed in step S605 by the plug-in 105 to acquire the edit sheet size.

In step S801, the edit sheet size acquisition program reads the application sheet size information 107 held in the plug-in 105 and holds it on the program.

Next, in step S802, checking is performed as to whether there are installed applications for which the function of the plug-in 105 is supported. In this specific example, as described in the application sheet size information 107, the function of the plug-in 105 is supported for applications A, B, and C. In the example shown in FIG. 1, the application A 103 and the application B 104 are detected as the installed applications. Thus, in step S802, it is determined that the PC 101 is in a state in which the applications A and B for which the function of the plug-in 105 is supported have been installed, but the application C has not been installed.

Next, in step S803, based on the application sheet size information 107 in terms of the applications A and B that have been detected in step S802 as the installed applications, a smallest one of the maximum sheet sizes usable by the applications A and B is detected.

Thus, in this specific case, the size of 500 mm×500 mm, which is the maximum sheet size for the application A 103, is employed as the edit sheet size. Note that although the edit sheet size may be set to other values as long as the edit sheet size can be used in common by the applications, the determination of the edit sheet size according to the present embodiment is performed directly based on the application sheet size information 107 such that the smallest one of the maximum sheet sizes settable in the respective applications is employed as the edit sheet size.

In steps S802 and S803, as described above, the installed applications are detected, and the edit sheet size is determined based on the sheet size information associated with the detected applications. Alternatively, the detection of the installed applications in step S802 may not be performed, and the edit sheet size may be determined based on the application sheet size information 107 held in the plug-in.

This allows the current setting in terms of the edit sheet size to be directly employed when an uninstalled application is installed in the future, and allows data to be shared among all applications including the newly installed one without having to change the setting. That is, when data is copied from an application into the newly installed application, it is not necessary to perform a recalculation and resetting on the size, which leads to an improvement in operability.

In step S606, a comparison is performed in terms of width and length between the edit sheet size and the output size. If the output size is greater in either the width or the length than the edit sheet size, the process proceeds to step S607. In step S607, the sheet size is calculated. Note that the sheet size refers to the size set by the plug-in 105 for the application.

Figure 9:
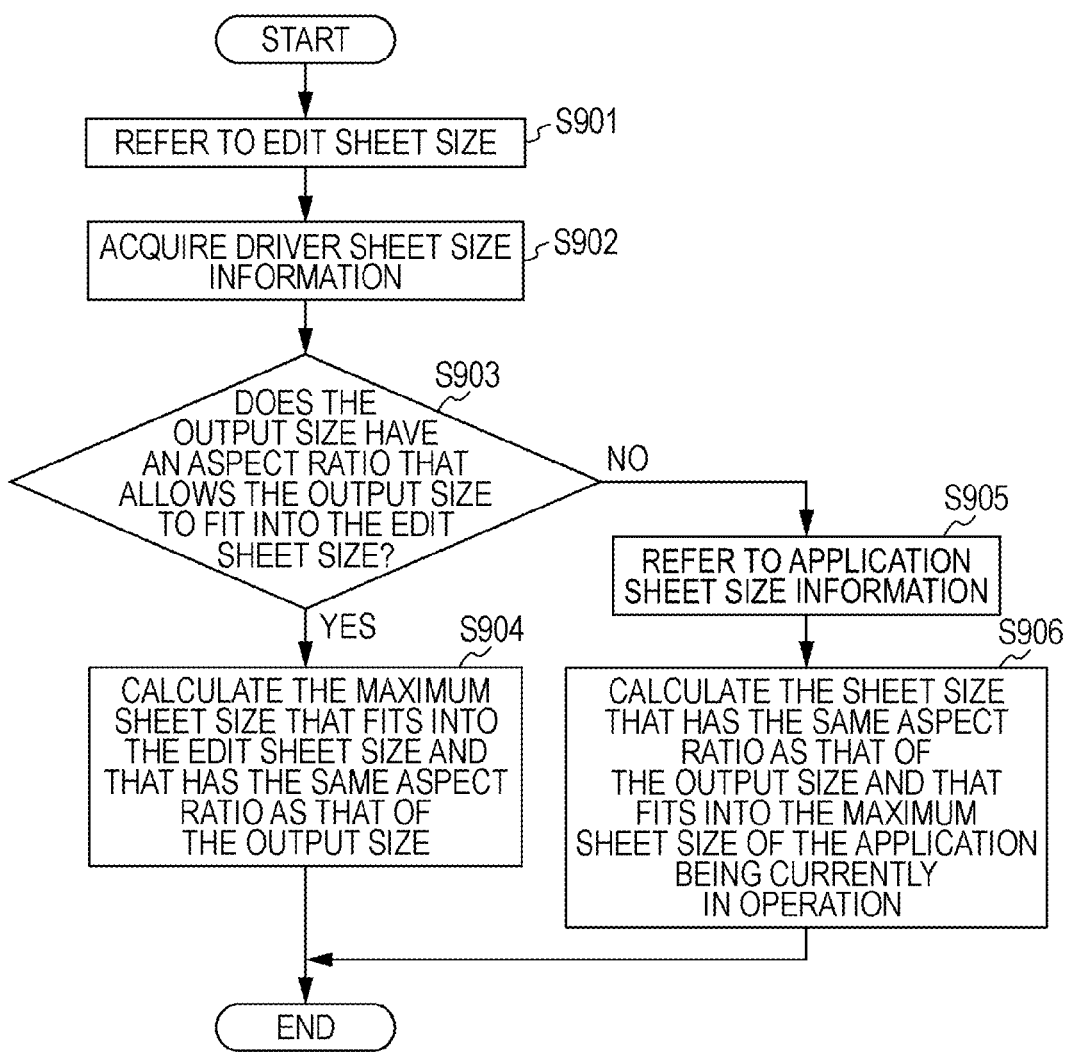
FIG. 9 is a flow chart illustrating a program of calculating a sheet size.

FIG. 9 is a flow chart illustrating a sheet size calculation program executed in step S607 described above by the plug-in 105 to calculate the sheet size.

In step S901, the sheet size calculation program refers to the edit sheet size acquired in step S605 and holds it on the program (in this specific example, the edit sheet size is 500 mm×500 mm for the application A 103). In step S902, the sheet size calculation program refers to the driver sheet size information 108 and holds it on the program. In the acquisition of the driver sheet size information 108 in this step, the plug-in 105 acquires it by sending a query to the printer driver 106.

Next, in step S903, a calculation is performed to determine the aspect ratio of the output size such that any side of the output size is equal to or greater than the minimum size prescribed in the driver sheet size information 108 and the output size is set to be as close to the edit sheet size as possible. Furthermore, a comparison is performed to check whether the output size with the calculated aspect ratio fits into the edit sheet size. In a case where it is determined in step S903 that the output size with the calculated aspect ratio fits into the edit sheet size, the sheet size is determined by employing the output size as the sheet size, and the process proceeds to step S904. However, in a case where it is determined in step S903 that the output size with the calculated aspect ratio does not fit into the edit sheet size, the process proceeds to step S905.

In step S904, a calculation is performed to determine such a maximum sheet size that has the same aspect ratio as that of the output size and that fits into the edit sheet size. In step S905, the application sheet size information 107 is read and held on the program. Next, in step S906, a calculation is performed to determine the size such that any side thereof is equal to or greater than the minimum size prescribed in the driver sheet size information 108 and the size fits into the maximum sheet size allowed to be used in the application being currently in operation.

Note that the application being currently in operation is the application the function of which is to be extended. For example, it may be an application for which a plug-in application is activated by a user and which is currently subjected to an editing operation, or it may be an application specified by the user.

Referring again to the flow of the plug-in program shown in FIG. 6, in step S608 after the calculation of the sheet size in step S607 is completed, setting of the printer driver 106 is performed in terms of the scaling factor. In this step, the setting of the printer driver 106 is changed so that the printing by the printer 102 is performed with the correct output size.

Figure 10A:
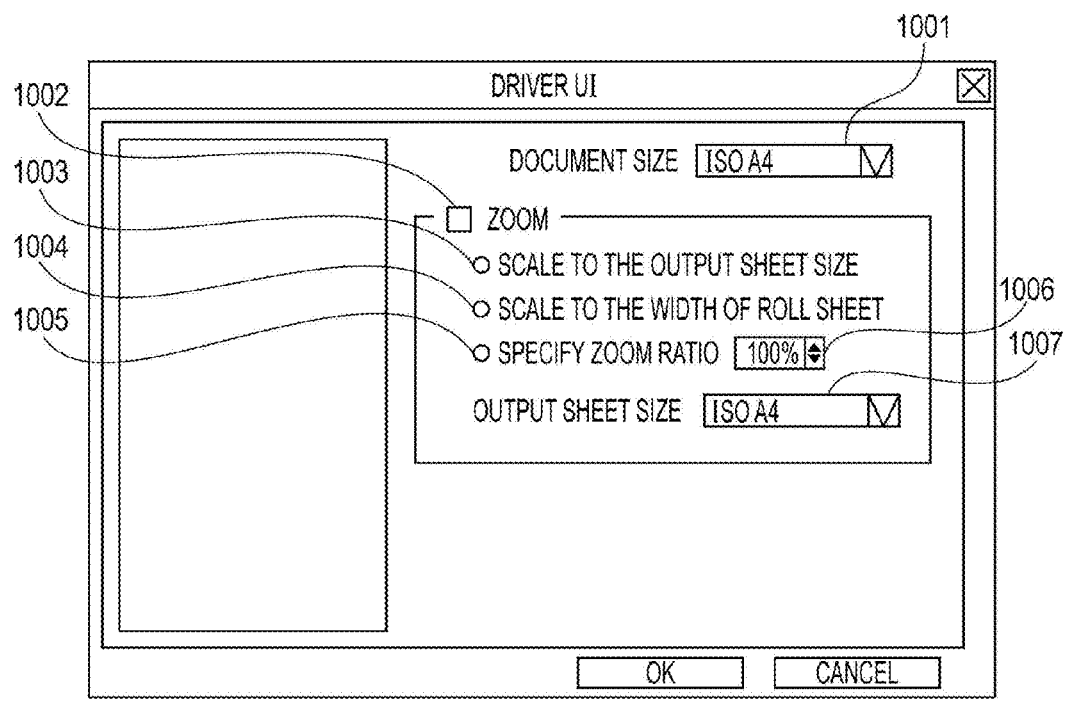
FIG. 10A is a diagram illustrating a printer driver setting dialog box.

FIG. 10A illustrates a setting dialog box of the printer driver 106 in terms of the scaling factor. Note that only the part relating to the setting of the scaling factor is shown in the figure. A document size combo box 1001 is a control to specify the sheet size of a document produced by the application.

If a zoom-up/down check box 1002 is checked, it is enabled to select a scaling mode from a plurality of choices described below. Reference numerals 1003, 1004, and 1005 denote radio buttons used to select a scaling mode. Note that only one of three scaling modes can be exclusively selected. An output sheet size combo box 1007 is a control to specify the output sheet size employed in the printing performed by the printer 102. A radio button 1003 is used to select a scaling mode in which the scaling is performed so as to fit to the output sheet size. In the setting of the printer driver 106, if the radio button 1003 is selected to fit to the output sheet size, the printer driver 106 performs scaling from the size specified in the document size combo box 1001 to the size specified in the output sheet size combo box 1007.

Figure 10B:
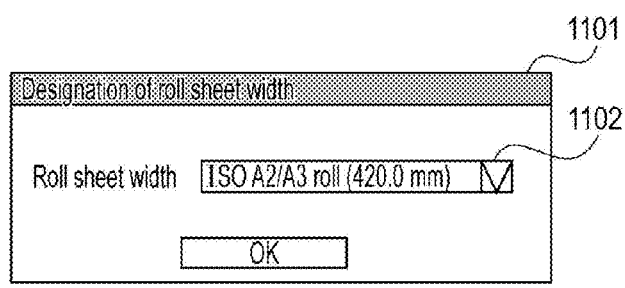
FIG. 10B is a diagram illustrating a roll sheet width designation dialog box.

A radio button 1004 is used to select a scaling mode in which the scaling is performed so as to fit to the width of a roll sheet. In the setting of the printer driver 106, if the radio button 1004 is selected to fit to the roll sheet width, the printer driver 106 activates a roll sheet width designation dialog box 1101 shown in FIG. 10B so that a user is allowed to specify the roll sheet width. In this scaling mode, the printer driver 106 performs scaling from the width of the size specified in the document size combo box 1001 to the width specified in the roll sheet width combo box 1102. A radio button 1005 is used to specify a scaling mode in which the scaling is performed according to a zoom ratio specified in a zoom ratio spin box 1006. In the setting of the printer driver 106, if the radio button 1005 is selected, the printer driver 106 performs scaling such that the size specified in the document size combo box 1001 is scaled by the zoom ratio specified in the zoom ratio spin box 1006.

Note that the scaling modes in which the scaling is performed by the printer driver 106 are not limited to those described above with reference to FIGS. 10A and 10B, but the plug-in according to the present embodiment of the invention may be applied to a printer driver having at least one such scaling mode.

In step S608 in FIG. 6, the printer driver 106 is set according to the selected scaling mode such that the sheet size is scaled from the sheet size to the output size. Note that it is desirable that this setting of the printer driver 106 be internally performed by the plug-in 105 without opening the printer driver setting dialog box shown in FIG. 10A. There is no particular restriction on the technique of this setting. For example, the setting may be performed using an extended API of the printer driver.

In step S609, the application is set in terms of the sheet size calculated in step S607 by the sheet size calculation program. Finally, in step S610, a process is performed to close the output sheet size designation dialog box 401, and the plug-in program is ended.

In a case where the determination in step S606 described above is that the output size fits into the edit sheet size, step S607 is skipped but steps S608, 5609, and S610 are performed assuming that the output size is to be the same as the sheet size, and the plug-in program is ended after these steps are completed.

The edit screen shown in FIG. 5 is opened for use by a user. Note that in this edit screen, the sheet size has the value set by the plug-in. The user is allowed to perform editing such as inputting of characters, putting of objects such as an illustration, etc., on the document 305. After the editing, the user is allowed to send a print command to the printer driver via the application.

The process shown in the flow chart of FIG. 6 is explained in further detail for some specific cases in which it is assumed that specific parameters are given and the plug-in 105 is currently operating on the application B 104.

[Case 1: The output size is 1000 mm×4000 mm]

In step S605 after previous steps are completed, the edit sheet size is acquired. First, in step S801, the application sheet size information 107 is referred to, and then in step S802 checking is performed as to whether there are installed applications for which the function of the plug-in is supported. More specifically, the checking is performed to determine whether one or more applications described in the application sheet size information 107 have been installed. As a result of the checking, in this specific case, it is determined that the application A 103 and the application B 104 have been installed.

Next, in step S803, among the maximum sheet sizes allowed to be set in the installed applications, the smallest one is detected. More specifically, based on the installed applications detected in step S802 and based on the application sheet size information 107, the sheet size of 500 mm×500 mm, which is the maximum sheet size settable in the application A 103, is detected as the smallest among the maximum sheet sizes.

Next, in step S606, checking is performed as to whether the output size fits into the edit sheet size. To this end, a comparison is performed between the width of the edit sheet size (500 mm) and the width of the output size (1000 mm) and between the length of the edit sheet size (500 mm) and the length of the output size (4000 mm). In this specific case, the width and the length of the output size are greater than those of the edit sheet size, and thus the process proceeds to step S607. In step S607, the sheet size is calculated.

In step S901, the edit sheet size (500 mm×500 mm) acquired in step S605 is referred to. Next, in step S902, the driver sheet size information 108 (100 mm×100 mm to 1524.0 mm×18000.0 mm) is referred to. Next, in step S903, a calculation is performed to determine the aspect ratio of the output size such that any side of the output size is equal to or greater than the minimum size (100 mm×100 mm) prescribed in the driver sheet size information 108 and either one of vertical and horizontal sides is set to be as close to the edit sheet size (500 mm×500 mm) as possible.

Figure 11:
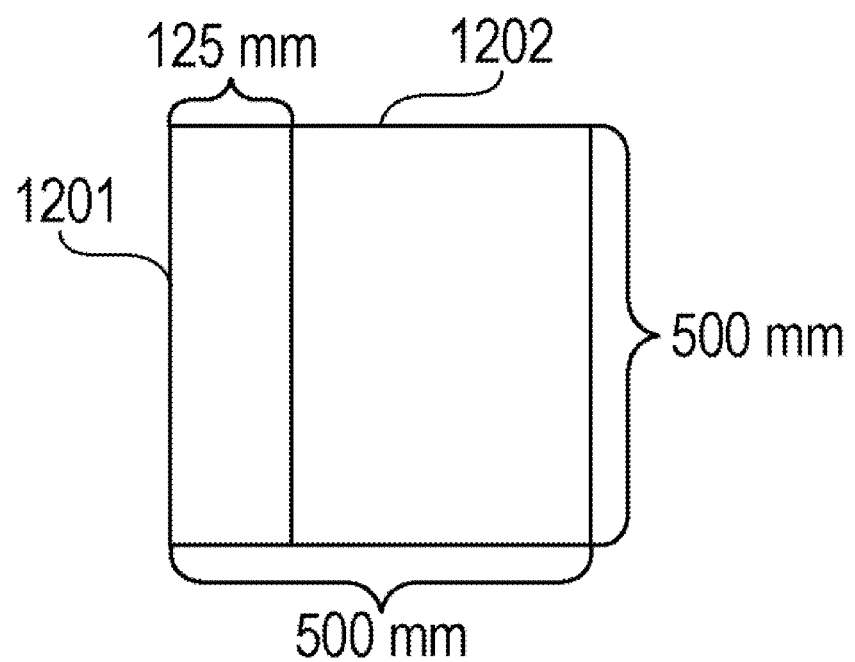
FIG. 11 is a diagram illustrating a sheet size with an output size of 1000 mm×4000 mm.

Furthermore, a comparison is performed to check whether the output size with the calculated aspect ratio fits into the maximum sheet size. FIG. 11 schematically illustrates the comparison performed in step S903. In FIG. 11, reference numeral 1202 denotes the edit sheet size acquired in step S605. In this example, the edit sheet size is 500 mm×500 mm. Reference numeral 1201 denotes a size with the same aspect ratio as that of the output size. That is, the size 1201 is 125 mm×500 mm which is determined such that any side thereof is equal to or greater than the minimum size 100 mm prescribed in the driver sheet size information 108 and either one of vertical and horizontal sides is set to be as close to the edit sheet size as possible. Note that the vertical size is equal to that of the edit sheet size 1202.

In this example, the output size with the calculated aspect ratio fits into the edit sheet size, and thus the process proceeds to step S904. In step S904, the size is calculated as 125 mm×500 mm as indicated in FIG. 11 as the size 1201.

Thereafter, in steps S608 and S609, setting of the printer driver in terms of the scaling factor and setting of the application in terms of the sheet are performed. Thus the plug-in function is completed, and the screen shown in FIG. 5 is displayed.

[Case 2: The output size is 1000 mm×10000 mm]

In step S605 after previous steps are completed, an edit sheet size is acquired. First, in step S801, the application sheet size information 107 is referred to, and then in step S802 checking is performed as to whether there are installed applications for which the function of the plug-in is supported. More specifically, the checking is performed to determine whether one or more applications described in the application sheet size information 107 have been installed. As a result of the checking, in this specific case, it is determined that the application A 103 and the application B 104 have been installed.

Next, in step S803, among the maximum sheet sizes allowed to be set in the installed applications, the smallest one is detected. More specifically, based on the installed applications detected in step S802 and based on the application sheet size information 107, the sheet size of 500 mm×500 mm, which is the maximum sheet size settable in the application A 103, is detected as the smallest among the maximum sheet sizes.

Next, in step S606, checking is performed as to whether the output size fits into the edit sheet size. To this end, a comparison is performed between the width of the edit sheet size (500 mm) and the width of the output size (1000 mm) and between the length of the edit sheet size (500 mm) and the length of the output size (10000 mm). In this specific case, the width and the length of the output size are greater than those of the edit sheet size, and thus the process proceeds to step S607.

In step S607, the sheet size is calculated. In step S901, the edit sheet size (500 mm×500 mm) acquired in step S605 is referred to. Next, in step S902, the driver sheet size information 108 (100 mm×100 mm to 1524.0 mm×18000.0 mm) is referred to.

Next, in step S903, a calculation is performed to determine the size such that the size has the same aspect ratio as that of the output size, any side is equal to or greater than the minimum size (100 mm×100 mm) prescribed in the driver sheet size information 108, and either one of vertical and horizontal sides fits into the edit sheet size (500 mm×500 mm). Furthermore, a comparison is performed to check whether the output size with the calculated aspect ratio fits into the edit sheet size.

Figure 12:
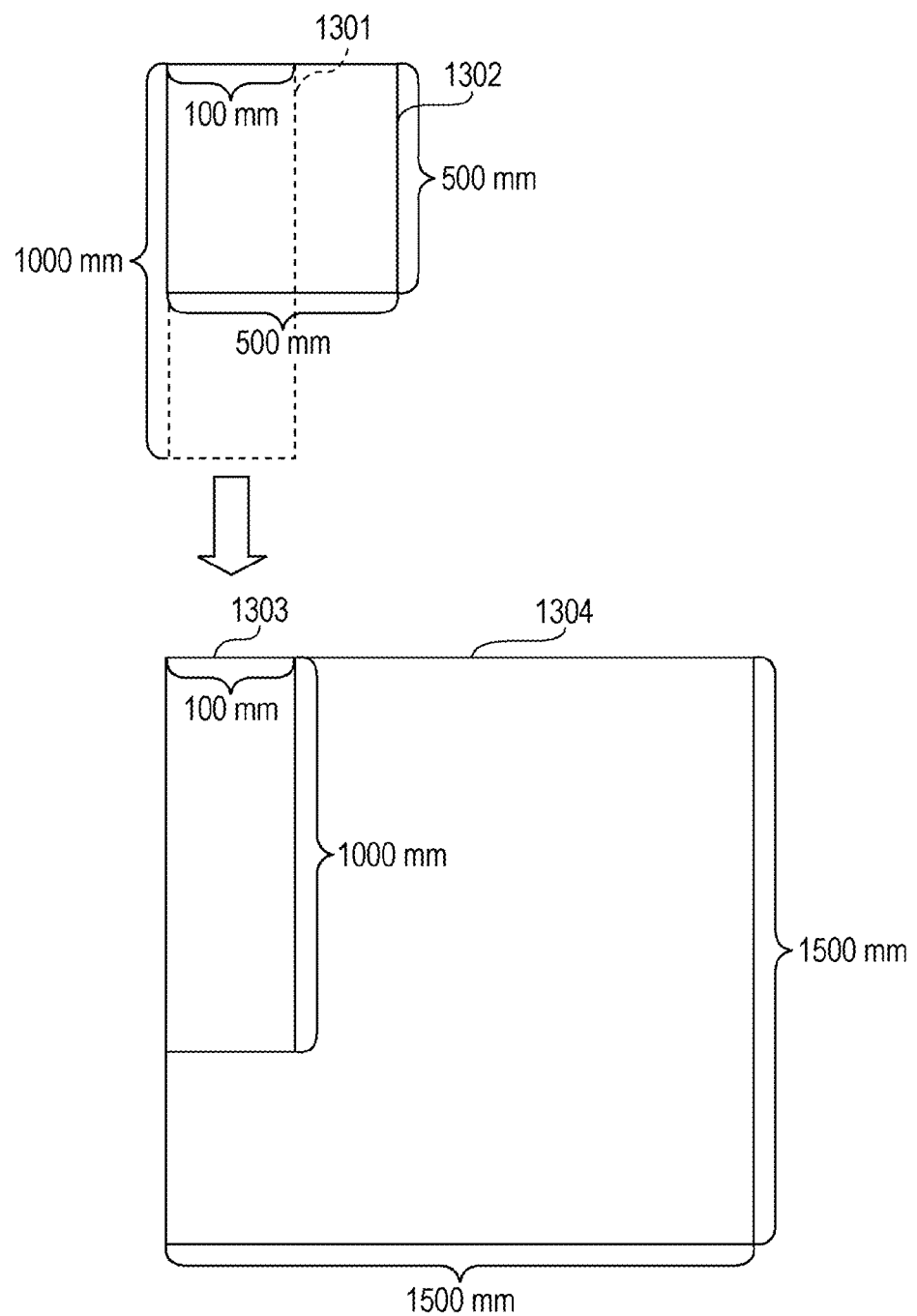
FIG. 12 is a diagram illustrating a sheet size with an output size of 1000 mm×10000 mm.

FIG. 12 schematically illustrates the comparison performed in step S903. In FIG. 12, reference numeral 1302 denotes the edit sheet size acquired in step S605. In this example, the edit sheet size is 500 mm×500 mm. Reference numeral 1301 denotes the size set to be equal in aspect ratio to the output size. That is, the size 1301 is 100 mm×1000 mm which is determined such that any side thereof is equal to or greater than the minimum size 100 mm prescribed in the driver sheet size information 108 and either one of vertical and horizontal sides is set to be as close to the edit sheet size as possible. In this example, the output size with the calculated aspect ratio does not fit into the edit sheet size, and thus the process proceeds to step S905.

In FIG. 12, reference numeral 1303 denotes the size of 100 mm×1000 mm calculated above, and reference numeral 1304 denotes the maximum sheet size, i.e., 1500 mm×1500 mm, settable in the application B that is currently active on the computer (and is being currently used by a user). In step S905, the application sheet size information 107 is referred to. In step S906, the calculation is performed to determine the minimum size such that the size has the same aspect ratio as that of the output size, any side is equal to or greater than the minimum size (100 mm×100 mm) prescribed in the driver sheet size information 108, and either one of vertical and horizontal sides fits into the maximum sheet size (1500 mm×1500 mm) of the application B being currently active on the computer. The result of the calculation is 100 mm×1000 mm as indicated in FIG. 12 as the size 1303.

Thereafter, in steps S608 and S609, the printer driver and the application are set according to the above result. Thus the plug-in function is completed, and the screen shown in FIG. 5 is displayed.

As described above, by selecting the smallest one from the maximum sheet sizes that are allowed to be set for the plurality of applications for which the plug-in function is supported, and by employing the selected sheet size as the edit sheet size, it becomes possible to use the selected smallest sheet size as the common sheet size set by the plug-in for all applications. Thus, when data is shared by a plurality of applications, even if a printed matter to be output has a size greater than the maximum sheet size allowed to be set in the applications, it is not necessary to perform recalculation and resetting of the sheet size separately for applications, and thus a great improvement in operability is achieved.

Furthermore, by checking the presence of a plurality of installed applications for which the plug-in function is supported, and employing as the edit sheet size a sheet size selected from the maximum sheet sizes settable for the installed applications, it becomes possible to share data in a more efficient and easier manner.

If plug-in software is installed individually for each application as is the case with the conventional techniques, when the maximum sheet size settable in an application is great as is the case with Microsoft PowerPoint (trademark), the sheet size is always set to be equal to this maximum sheet size. As a result, when an object is copied and pasted to use it in another application, there is a possibility that the object with the great size does not fit into the edit screen of the application.

In such a case, it is difficult for a user to understand which part of the whole object is being currently edited. In the present embodiment of the invention, unlike the conventional techniques, use of the plug-in software in common for a plurality of applications makes it possible to reduce, if necessary, the sheet size used for an application depending on an output size. This leads to a reduction in the possibility that when an object produced by an application is used in another application, the object displayed on an edit screen has too great a size, and thus a further improvement in operability in an editing operation by a user is achieved.

The features of the present invention may also be achieved as follows. That is, program code of software implementing one or more functions according to one of or a mixture of above-described embodiments is stored on a storage medium, and the storage medium is supplied to a system or an apparatus. A computer (CPU or MPU) in the system or apparatus reads and executes the program code stored on the storage medium thereby achieving the functions. In this case, it should be understood that the program code read from the storage medium implements the functions of the embodiment and thus the storage medium storing the program code falls within the scope of present invention.

Storage media which may be employed in the present invention to supply the program code include a floppy disk, a hard disk, an optical disk, a magneto-optical disk, a CD-ROM, a CD-R, a magnetic tape, a non-volatile memory card, a ROM, and a DVD.

Furthermore, the scope of the present invention includes not only the case in which functions of any embodiment described above are implemented simply by reading and executing a program code on a computer but also a case in which part or all of the process may be performed by an operating system (OS) or the like running on the computer in accordance with the program code. Such implementation of the functions also falls within the scope of the present invention.

Furthermore, one or more functions according to one of or a mixture of above-described embodiments according to the present invention may be realized in such a manner that a program code is loaded from a storage medium into a memory on an extension board inserted in a computer or into a memory in an extension unit connected to a computer, and a CPU disposed on the extension board or in the extension unit executes all or part of the process in accordance with the program code. The realization in such a manner also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-076771 filed Mar. 26, 2009, which is hereby incorporated by reference herein in its entirety.

What is claimed is:

1. A method, used in common by a plurality of applications installed on a computer connected to a printing apparatus, for extending a function of the plurality of applications, comprising:
   specifying an output size indicating a size of a printed matter to be output by the printing apparatus;
   acquiring an edit sheet size by selecting a predetermined size from sheet sizes that are allowed to be set in common in the plurality of applications; and
   determining a sheet size to be set for the plurality of applications based on the output size specified in the specifying and based on the edit sheet size acquired in the acquiring.

2. The method for extending the function of the plurality of applications according to claim 1, further comprising:
   judging whether the output size fits into the edit sheet size acquired in the acquiring,
   wherein in the determining the sheet size, if the judging judges that the output size fits into the edit sheet size, the sheet size is determined by employing the output size as the sheet size, while if the judging judges that the output size does not fit into the edit sheet size, the sheet size is determined based on a sheet size that is allowed to be set in an application which is one of the plurality of applications and whose function is to be extended and that has the same aspect ratio as that of the output size.

3. The method for extending the function of the plurality of applications according to claim 1, further comprising:
   acquiring information associated with the applications installed on the computer,
   wherein in the determining the edit sheet size, the edit sheet size is determined based on the information associated with the applications acquired in the acquiring information.

4. The method for extending the function of the plurality of applications according to claim 1, further comprising:
   calculating a scaling factor by which the sheet size determined in the determining the sheet size is to be scaled to the output size.

5. A system that is used in common on a plurality of applications installed on a computer connected to a printing apparatus and that is configured to extend a function of the plurality of applications, comprising:
   a specification unit which specifies an output size indicating a size of a printed matter to be output by the printing apparatus;
   an edit sheet size acquisition unit which acquires an edit sheet size by selecting a predetermined size from sheet sizes that are allowed to be set in common in the plurality of applications; and
   a sheet size determination unit which determines a sheet size to be set for the plurality of applications based on the output size specified by the specification unit and the edit sheet size acquired by the edit sheet size acquisition unit.

6. The system configured to extend the function of the plurality of applications according to claim 5, further comprising:
   a judgment unit which judges whether the output size fits into the edit sheet size acquired in the edit sheet size acquisition unit,
   wherein the sheet size determination unit determines the sheet size such that if the judgment unit judges that the output size fits into the edit sheet size, the sheet size is determined by employing the output size as the sheet size, while if the judgment unit judges that the output size does not fit into the edit sheet size, the sheet size is determined based on a sheet size that is allowed to be set in an application which is one of the plurality of applications and whose function is to be extended and that has the same aspect ratio as that of the output size.

7. The system configured to extend the function of the plurality of applications according to claim 5, further comprising:

an application information acquisition unit which acquires information associated with the applications installed on the computer, wherein the edit sheet size determination unit determines the edit sheet size based on the information associated with the applications acquired by the application information acquisition unit.

8. The system configured to extend the function of the plurality of applications according to claim 5, further comprising:

a calculation unit which calculates a scaling factor by which the sheet size determined by the sheet size determination unit is to be scaled to the output size.

9. A non-transitory computer-readable storage medium containing computer-executable instructions for controlling a system that is used in common on a plurality of applications installed on a computer connected to a printing apparatus and that is configured to extend a function of the plurality of applications, the medium comprising:

computer-executable instructions that make a user specify an output size indicating a size of a printed matter to be output by the printing apparatus;

computer-executable instructions that acquire an edit sheet size by selecting a predetermined size from sheet sizes that are allowed to be set in common in the plurality of applications; and computer-executable instructions that determine a sheet size to be set for the plurality of applications based on the output size specified in the specifying and based on the edit sheet size acquired in the acquiring.

\* \* \* \* \*